April 22, 1924.
G. BROWN
1,491,332
WORK SUPPORTING AND CENTERING DEVICE FOR GRINDING MACHINES
Filed Oct. 31, 1921
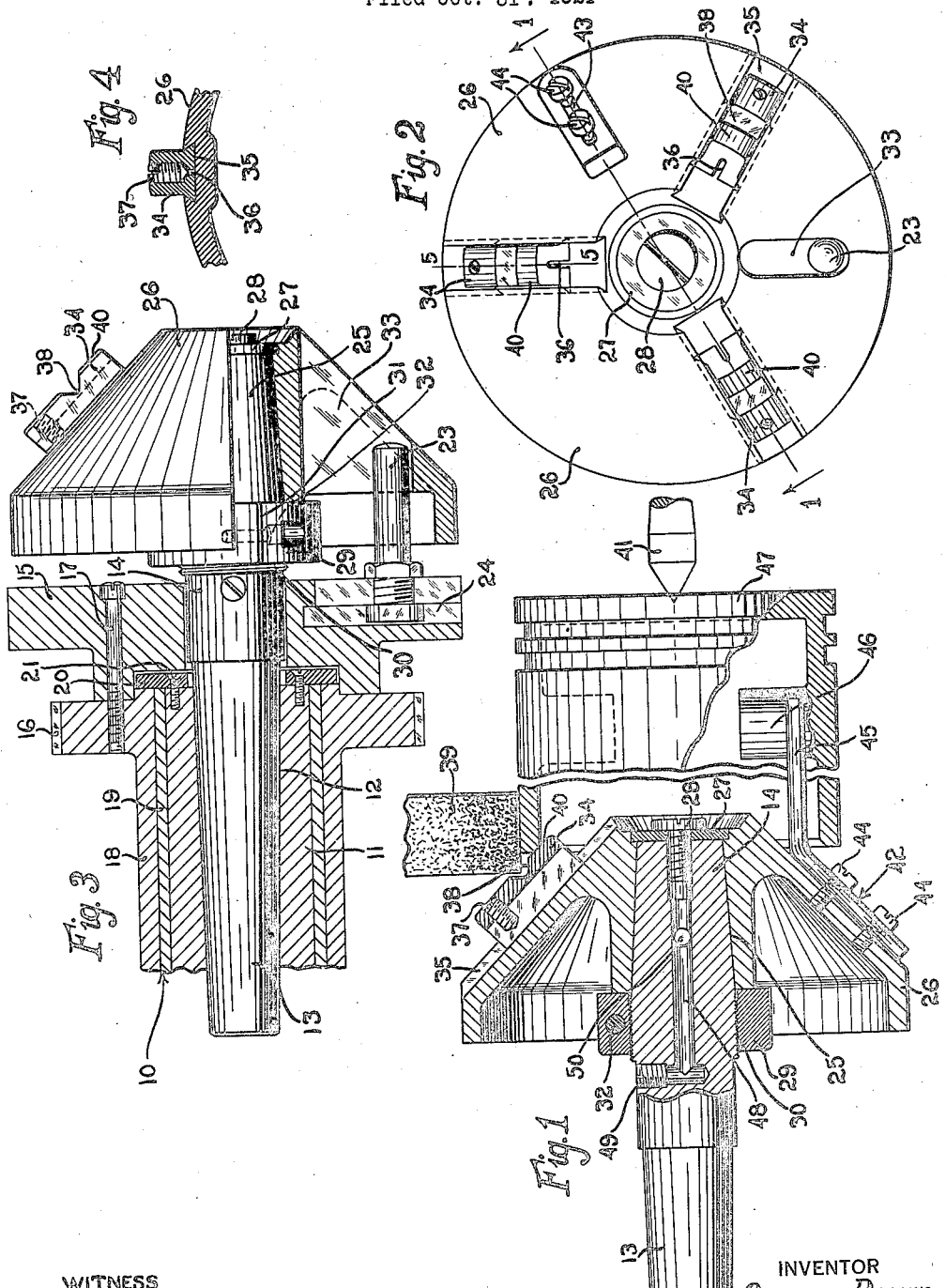
WITNESS
Harold W. Eaton
INVENTOR
Gregory Brown
BY
Clayton R. Jenks
ATTORNEY

Patented Apr. 22, 1924.

1,491,332

UNITED STATES PATENT OFFICE.

GREGORY BROWN, OF WORCESTER, MASSACHUSETTS, ASSIGNOR TO NORTON COMPANY, OF WORCESTER, MASSACHUSETTS, A CORPORATION OF MASSACHUSETTS.

WORK SUPPORTING AND CENTERING DEVICE FOR GRINDING MACHINES.

Application filed October 31, 1921. Serial No. 511,612.

*To all whom it may concern:*

Be it known that I, GREGORY BROWN, a citizen of the United States of America, residing at Worcester, in the county of Worcester and State of Massachusetts, have invented certain new and useful Improvements in Work Supporting and Centering Devices for Grinding Machines, of which the following is a full, clear, and exact specification.

My invention relates to grinding machines and more particularly to a universal attachment for centering various sizes of cylindrical articles, such as automobile pistons, and supporting the same on the headstock for grinding cylindrical surfaces on their exteriors.

Heretofore, in order to regrind an automobile piston, difficulty has been experienced in supporting and centering the piston on the headstock spindle, and yet permitting the whole surface of the piston to be ground without injuring the support member. A common construction has involved a cone rotatably mounted on the headstock spindle, the apex of the cone being in the center line between the head and tail stock spindles. Various sized pistons, which are hollow, may be centered against the surface of this cone. In many cases it has been necessary to file a notch in the inner edge of the piston in order to locate it on a ridge ordinarily provided in the cone for driving the work, but this has resulted in thin walled pistons becoming warped. It has also been difficult to grind the end portion of such pistons adjacent to the cone without running into the surface of the cone and thus injuring the supporting member.

It is accordingly an object of my invention to overcome such difficulties by employing a driving and centering member which will provide a three point support for such hollow cylindrical bodies, which may be readily adjusted to accommodate work of various sizes and which will permit the work to be ground completely to its edge without injuring its support. Further objects will be apparent in the following disclosure.

In the drawings in which like numerals indicate like parts:

Figure 1 is a sectional view, partly in elevation, of my supporting device taken on the line 1—1 of Fig. 2, showing a piston mounted thereon for grinding;

Fig. 2 is a front view of the holding device showing the three work supporting slides and the drive pin;

Fig. 3 is a part sectional and part elevation thereof showing my device mounted on the usual headstock spindle; and Fig. 4 is a section through one of the work supporting slides.

In accordance with my invention, I provide a work supporting device adapted, in cooperation with a suitable tailstock, to center a hollow cylindrical article, such as an automobile piston, and to rotatively support the same upon the headstock while its external cylindrical surface is being ground. This device comprises a rotatably driven member carrying work supporting slides adjustably mounted thereon. In order that hollow work of various sizes may be accurately centered, these slides are so shaped that the center lines of their effective plane surfaces radiate from the axial line between the headstock and footstock centers of the grinding machine. These slides are raised above their support and clearance spaces provided adjacent the work supporting surfaces so that the grinding wheel may pass the edge of thin work.

Referring to the drawings, which illustrate a specific embodiment of my invention, I have shown my supporting and driving device as applied to a headstock 10 of usual construction (a part only being illustrated) provided with a spindle 11 having a central opening 12 into which the tapered shank 13 of the dead center 14 is driven. The usual drive or face plate 15, I have shown connected by suitable means such as screws 17, with a gear 16, this gear being mounted for rotation through its wide hub 18 and a bearing bushing 19 on the forward end of the headstock spindle 11. The means for retaining the gear and bushing in place on the spindle may consist of an annular plate 20 connected to the spindle as by screws 21. The connected gear and drive plate may be driven in any suitable way, such as from the usual shaft carrying a cone pulley arranged on the headstock. The drive plate 15 carries the usual drive pin 23 adjustably mounted in the radially extending T slot 24.

The nose of the dead center 14 has a hardened tapered bearing surface 25 upon which the work support 26 is rotatably mounted. This support, which may be of suitable shape, is here shown as a hollow cone. It is held in place by means of a collar 27 on the outer end of the tapered portion 25 and the screw 28 which is threaded into the end of the center 14. An adjustable thrust collar 29, fitted on the threaded portion 30 of the center 14, is split at 31 and provided with a screw 32 to lock the collar 29 in adjusted position for taking up wear. The cone is rotatably driven by means of the pin 23 on the face plate engaging the side of an elongated slot 33 in the cone.

In order to center cylinders of different sizes, I provide the conical member 26 with preferably three work supporting slides 34 which are suitably mounted so that their effective surfaces may form a three point support and automatically center a cylinder held thereagainst. These surfaces are shown as so formed that their center lines radiate from the axial line of the work and form elements of the same cone. They are so supported that the center lines move along the same cone elements for all adjustments of the slides. A simple construction for supporting these slides involves, as illustrated, a set of dovetailed slideways 35 provided in the cone and adapted to permit the slides to be adjustably mounted therein. The center lines of the effective plane surfaces of the dovetailed slots similarly form elements of a cone, the center lines of the slots and the slides being parallel. Each work supporting slide 34 is provided with a longitudinal slot 36 which enables the dovetailed portion of the slide 34 to be spread by means of a taper pointed set screw 37 and lock the slide 34 in adjusted position. Each slide 34 has a clearance space adjacent its effective work supporting face. In the form shown, this consists of a cut-out portion 38, which permits the grinding wheel 39 to pass by the end of the work (Fig. 1) without damaging the slide, it being noted that the work contacts with the slide below the cut-out. This clearance may of course be had at the end of the slide if the work is supported close to the upper edge.

The effective faces 40 of the slides 34 are formed by grinding them as sections of a cone, while the slides are in position on the lower ends of the slideways 35, thus making the center lines 5—5 of faces 40 parallel to the center lines of the plane surfaces of the slideways 35. The surfaces 40 on these center lines will therefore form a three point support for the hollow end of the piston and will locate it centrally, provided the tailstock center 41 (diagrammatically shown) engages the piston on its center line. It therefore will be seen that pistons of various sizes may be centrally located and ground by making proper adjustments of the slides.

I also provide means for positively driving the piston comprising a driving member 42 which is adjustably mounted on the conical surface of the member 26 as by an elongated slot 43 in the driver and the screws 44 in the cone. The driving member 42 is adjustable on a line substantially an element of said conical member to accommodate various sizes of work. The projecting drive pin 45 of the driving member 42 is adapted to engage one of the lugs 46 within the piston 47 and to drive the same. In order that the surface 25 may be oiled, I have provided an oil duct 48 within the center 14, which is closed at its ends by screw 28 and a screw cap 49, a cross passage 50 connecting the duct 48 with the bearing surface.

In the operation of my device, the open end of a piston 52, or other cylindrical work which has a hollow end, is held against the outer faces 40 of the slides 34 and the footstock center 41 is then brought up against the other end of the work. The slides 34, which have previously been loosened, are then roughly adjusted in the slideways 35 so that the clearance grooves 38 of the slides are just below the peripheral face of the piston. The set screws are then tightened to fix the slides in position. This enables the grinding wheel 39 to pass by the end of the piston (Fig. 1) without damaging the slides or any part of the device.

Having thus described my invention, what I claim as new and desire to secure by Letters Patent is:

1. A supporting and centering attachment for grinding the external surface of a hollow cylinder comprising a rotatable support and a plurality of slides adjustably mounted thereon so that the center lines of their work supporting surfaces move along the elements of a cone and adapted to support work of various sizes.

2. A supporting and centering attachment for grinding the external surface of a hollow cylinder comprising a rotatable support and a plurality of raised slides adjustably mounted thereon so that their center lines move along the elements of a cone, said slides having surfaces adapted to center various sizes of work which terminate in a clearance space for the grinding wheel.

3. In a grinding machine, in combination with a footstock centering and supporting device, a headstock including a dead center, a work supporting member rotatably mounted on said center and a plurality of raised work supporting slides adjustably mounted on said member, said slides being so constructed and arranged that, for all positions thereof, their outer surfaces provide a three point centering support for any size of hollow cylindrical work which engages the slides.

4. A supporting and centering attachment for grinding machines comprising a rotatably mounted driven member, a plurality of slides adjustably mounted thereon for movement with the center lines of their work supporting surfaces always forming elements of a cone, means to fasten said slides in adjusted position and means on said support adapted to engage and drive the work.

5. A work supporting and centering device for grinding machines comprising a dead center having a bearing surface on its outer end, a cone rotatably mounted on said bearing surface and having dovetailed slideways, the center lines of which constitute elements of a cone, and adjustably positioned slides mounted in said slideways having work supporting surfaces which for any position form sections of a cone, the elements of which are parallel with the center line of the supporting slideways.

6. A work supporting and centering device for grinding machines comprising a dead center having a bearing surface on its outer end, a cone rotatably mounted on said bearing surface and having dovetailed slideways the center lines of which form elements of a cone, work supporting slides adjustably mounted in said slideways and means to fasten them rigidly to the cone, each of said slides being provided with a cut-out portion adjacent a work supporting surface which permits the grinding wheel to grind to and past the edge of the work.

7. A work supporting and centering device for grinding machines comprising a dead center having a bearing surface on its outer end, a cone rotatably mounted on said bearing surface and having dovetailed slideways, the center lines of which constitute elements of a cone, adjustably positioned slides mounted in said slideways and having raised supporting surfaces which for a given position form sections of a cone, said slides having cut-out portions adjacent the cone surfaces which provide clearance for a grinding wheel, and means on each slide for adjustably clamping the slide to the slideway while a cylindrical body is supported thereon.

Signed at Worcester, Massachusetts, this 26th day of October, 1921.

GREGORY BROWN.